United States Patent [19]

Tang

[11] Patent Number: 4,786,068
[45] Date of Patent: Nov. 22, 1988

[54] UNICYCLE

[76] Inventor: Chun-Yi Tang, 12 Diamond S. Ranch, Bellevue, Wash. 98004

[21] Appl. No.: 879,985

[22] Filed: Jun. 30, 1986

[51] Int. Cl.⁴ ............................................. B62K 1/00
[52] U.S. Cl. ................................... 280/221; 74/594.1; 74/594.4; 272/73; 272/114; 280/11.115
[58] Field of Search .................. 280/205, 221, 11.115; 74/594.1, 594.2, 594.4; 272/114, 73; 105/142

[56] References Cited

U.S. PATENT DOCUMENTS

| 88,683 | 4/1869 | Ward | 280/205 |
|---|---|---|---|
| 473,030 | 4/1892 | Sweetland | 74/594.4 |
| 490,391 | 1/1893 | Libbey | 301/5 R |
| 1,225,181 | 5/1917 | Schleicher | 152/155 |
| 1,286,539 | 12/1918 | Colon | 280/259 |
| 1,333,292 | 3/1920 | Casae | 280/259 |
| 2,084,373 | 6/1937 | Anderson | 74/594.4 |
| 2,920,904 | 1/1960 | Doud et al. | 280/205 X |
| 2,946,625 | 7/1960 | Crain et al. | 301/41 R |
| 3,039,791 | 6/1962 | Horowitz et al. | 280/259 |
| 3,107,926 | 10/1963 | Verge | 280/221 |
| 3,133,749 | 5/1964 | O'Baraski | 280/291 |
| 3,190,675 | 6/1965 | Tang | 280/221 |
| 3,192,794 | 7/1965 | Counts | 74/481 |
| 3,506,283 | 4/1970 | Tang | 280/221 |

FOREIGN PATENT DOCUMENTS 1059390 2/1967 United Kingdom ................ 280/221

Primary Examiner—John J. Love
Assistant Examiner—Mitchell J. Hill
Attorney, Agent, or Firm—Delbert J. Barnard

[57] ABSTRACT

Tubular spacers (28) are positioned between the wheels (10, 12) of a unicycle. Inboard portions of tie bolts (34) extend through the spacers (28). A threaded end portion (38) of the tie bolt (34) screws into a T-nut (40) provided within an opening (26) in a wheel (12). The shaft of the tie bolt (34) projects through an opening (24) in the other wheel (10) and projects outwardly beyond the wheel (10). A second tubular spacer (50) closely surrounds the outboard portion of the tie bolt (34). At one end (52) this spacer bears against an abutment (46). At its opposite end (54) it abuts against the inner surface of the tie bolt head (36). When the tie bolt (34) is tightly screwed into the T-nut (46), it is put into tension and the tubular spacers (28, 50) are put into compression. A pedal element (56) is mounted for rotation about the outboard tubular spacer (50).

7 Claims, 3 Drawing Sheets

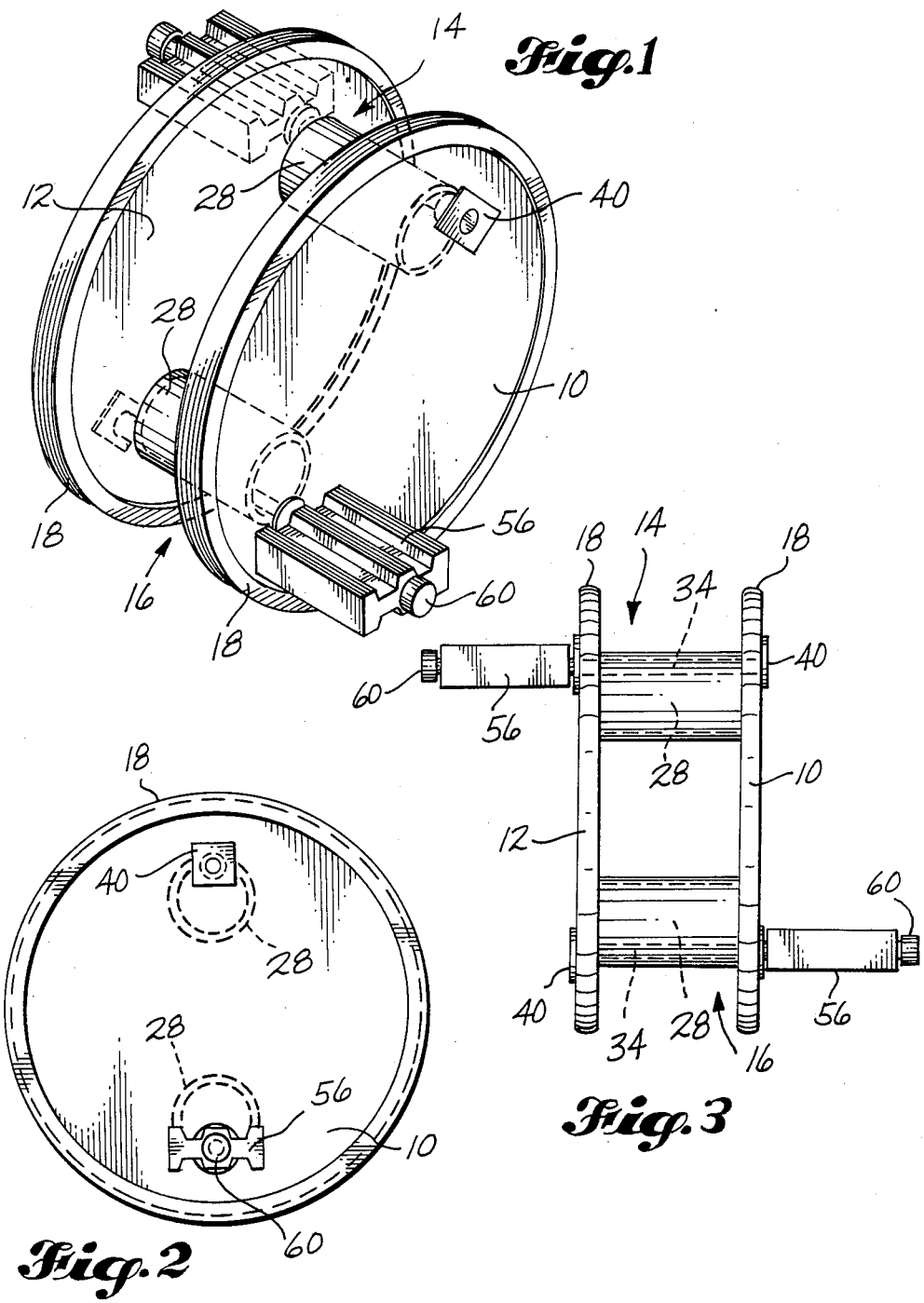

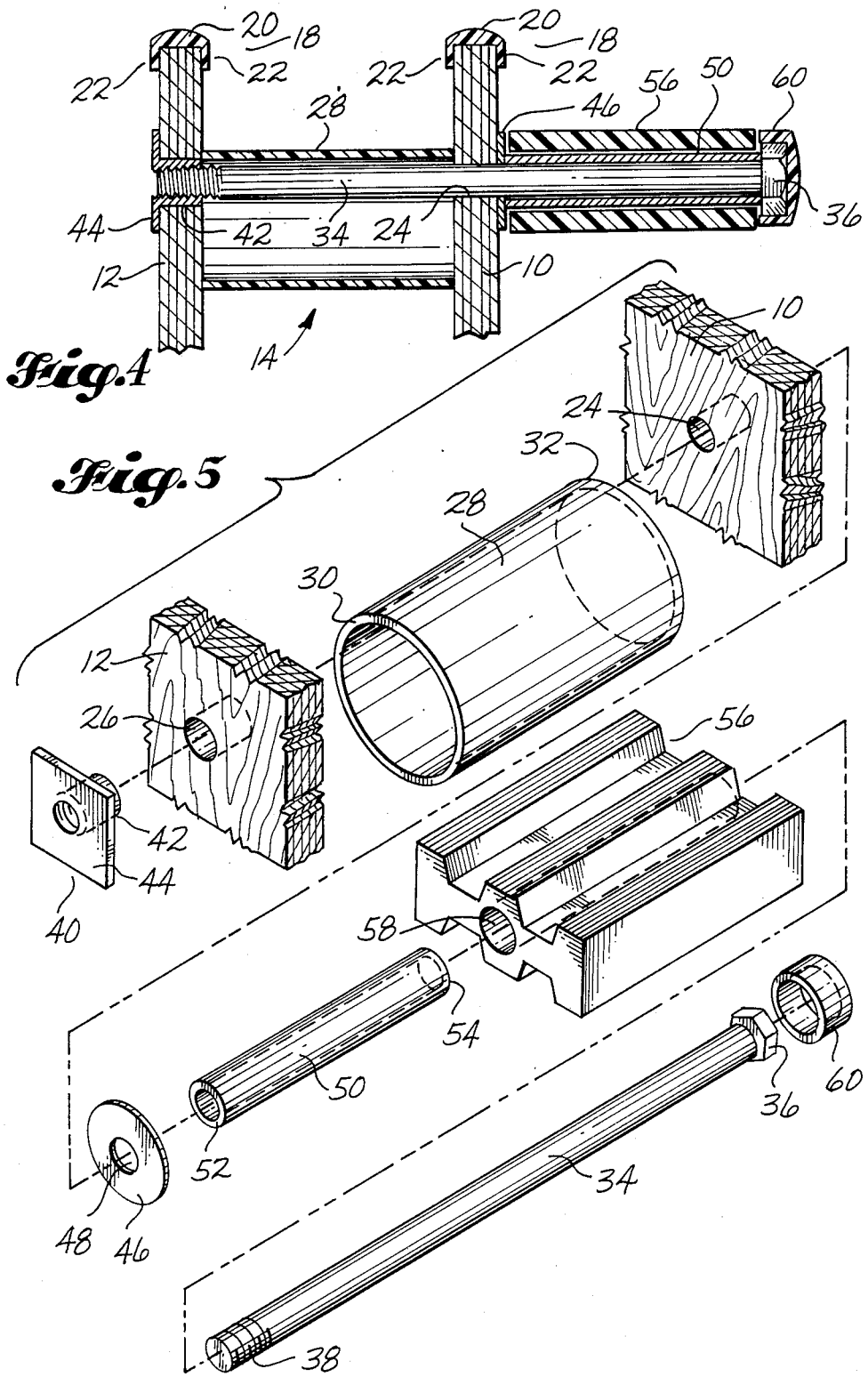

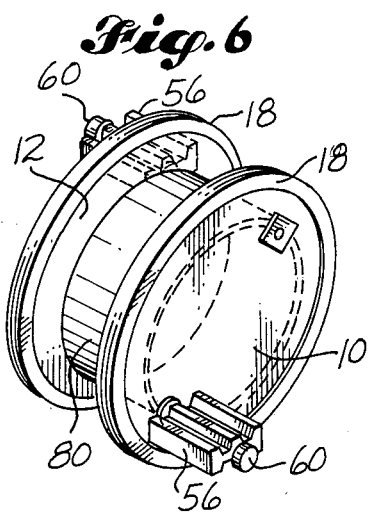
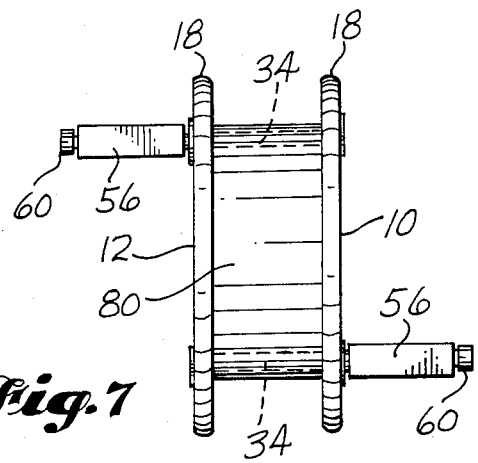
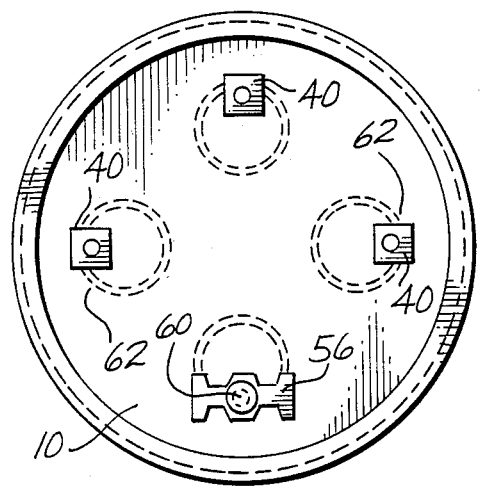
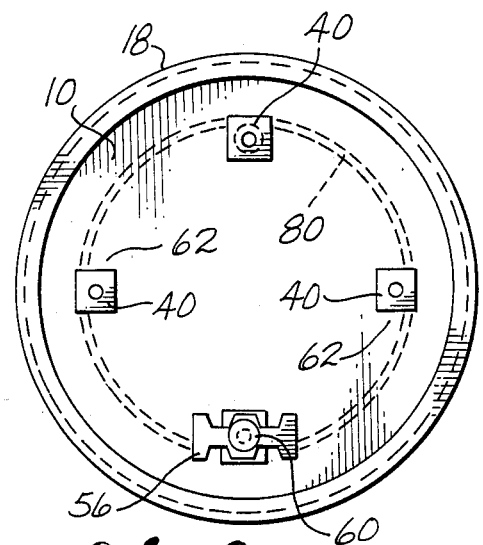
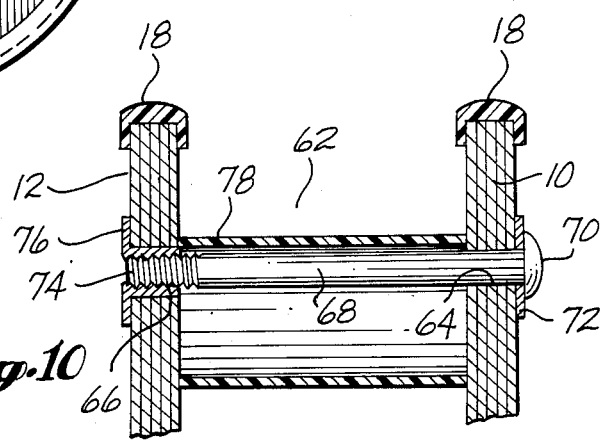

UNICYCLE

TECHNICAL FIELD

This invention relates to unicycles. More particularly, it relates to the provision of an improved construction of a unicycle, characterized by a relatively small number of parts, several of which perform dual functions, and a substantial reduction in manufacturing cost.

BACKGROUND ART

My efforts to develop a unicycle started many years ago. My first attempts are disclosed in my U.S. Pat. No. 3,190,675. Thereafter, I attempted marketing a unicycle that had a pair of disk wheels spaced apart by wooden blocks. These unicycles had wheel assemblies comprising a conventional bicycle pedal to which a bolt was welded at its mounting end. This bolt was inserted through openings in the wheels, adjacent the wooden blocks. A nut was applied to the threaded end of the bolt, outwardly of the wheel opposite the pedal. Attempts were made to market this type of unicycle several years ago. However, such attempts were unsuccessful because the manner of constructing the wheel assembly and connecting the two wheels together was not workable. The pedals would break away where they were welded to the bolts. Or, severe bending would occur in the region where the pedals were welded to the bolts. Also, the threaded connections at the end of the bolt kept coming loose. As a result of these failures, the commercial efforts to market the unicycle were unsuccessful.

The principal object of the present invention is to correct the faults of the prior unicycle, and to provide a product that is easy to manufacture, which involves components requiring very little manufacture, and which can be packaged in a disassembled condition and can be easily assembled by the user or by an attendant at a retail outlet.

DISCLOSURE OF THE INVENTION

The unicycle of the present invention is basically characterized by the use of an elongated one piece tie bolt for both securing the wheels together and supporting the pedals. The unicycle comprises a pair of spaced apart wheels and a pair of pedal assemblies which are themselves spaced apart diametrically of the wheels. The tie bolt is of a length slightly longer than the spacing of the two wheels and the length of a pedal. An inboard portion of the tie bolt spans between the two wheels. The pedal is mounted for rotation on an outboard portion of the tie bolt.

In accordance with the invention, a spacer is positioned between the wheels. Preferably this spacer is tubular and surrounds the tie bolt. A second tubular spacer surrounds the outboard portion of the tie bolt. This spacer bears at one end against an abutment means situated on the outside of the wheel and at its opposite end bears against the inside surface of the bolt head. The opposite end of the tie bolt is threaded and it threads into a threaded opening provided in the second wheel. The various components are assembled and the tie bolt is tightened. This tightening puts the tie bolt in tension and puts the spacers in compression. The presence of the spacer on the outboard portion of the tie bolt provides a set distance between the head of the tie bolt and the abutment means. A pedal element that is shorter than this distance is mounted for rotation about the outboard spacer. The spacer between the two wheels if tubular has edges at its opposite ends which dig into the inner surfaces of the two wheels when the tie bolt is tightened. This tubular spacer is put into compression and the compression is of such a magnitude that the two wheels are secured together and the position of each to the other is fixed, by the two pedal assemblies.

In accordance with an aspect of the invention, additional tie bolt assemblies may be used between the pedal assemblies. These tie bolt assemblies would be very much like the pedal assemblies. However, the head of the tie bolt bears directly against the abutment means. There is no outboard portion of the tie bolt. In other respects, the assembly is like the wheel assembly.

In accordance with another aspect of the invention, a single large diameter tubular spacer can be used between the two wheels. Such tubular spacer would be of a diameter to surround all of the tie bolts.

Additional more detailed features of the invention are described below as a part of the description of the best mode.

BRIEF DESCRIPTION OF THE DRAWING

Like reference numerals are used to designate like parts throughout the several views of the drawing, and:

FIG. 1 is an isometric view of a unicycle embodying the present invention, taken from above and looking toward one side and the rims of the wheels;

FIG. 2 is a side elevational view of the unicycle shown by FIG. 1;

FIG. 3 is an end elevation view of the unicycle shown by FIGS. 1 and 2;

FIG. 4 is a fragmentary sectional view taken through one of the pedal assemblies of the unicycle shown by FIGS. 1-3, with the tie bolt shown in elevation;

FIG. 5 is an exploded isometric view of the pedal assembly components and fragmentary portions of the wheels;

FIG. 6 is a reduced scale isometric view of a second embodiment of the invention;

FIG. 7 is an end elevational view of the embodiment of the invention shown in FIG. 6;

FIG. 8 is a side elevational view of a third embodiment of the invention which is basically like the first embodiment but which includes additional spacers and tie bolts;

FIG. 9 is a side elevational view of a fourth embodiment of the invention which is essentially like the embodiment shown by FIGS. 6 and 7 but which includes additional tie bolts; and FIG. 10 is a fragmentary sectional view showing one of the additional tie bolts.

BEST MODE FOR CARRYING OUT THE INVENTION

The unicycle shown by FIGS. 1-5 comprises a pair of wheels 10, 12, and a pair of pedal assemblies 14, 16.

Preferably, the wheels 10, 12 are constructed from discs of a wood product board and each is provided with a wear resistant tire 18 at its edge or rim portion.

As shown by FIG. 4, each tire comprises a tread portion 20 and a pair of sidewalls 22. The tread and sidewalls 20, 22 provide the tire 18 with a C-shaped cross section. The tires can be extruded in strips, then cut to length, and then connected together at their ends to form a tire 18. There are plastic materials available from which the tires 18 can be constructed. Such materials present a tough wear resistant tread 20. They can be extruded into the shape described. When heated, these materials will stretch substantially. When allowed to cool they shrink back to their original size. After the tires 18 have been formed, in the manner described, they can be heated and then stretched over the edges of the wheels 10, 12. Upon cooling, the tires 18 closely conform to the shape of the edges of the wheels 10, 12 and stay secured to the wheels 10, 12.

The pedal assemblies 14, 16 are identical in construction. Therefore only one pedal assembly (14) will be described. Referring to FIGS. 4 and 5, each pedal assembly comprises a first tubular spacer 28 which fits between the wheels 10, 12. In preferred form, the tubular spacer 28 is a length of plastic pipe. It may be the type of plastic pipe used in home plumbing. Regardless of the material, the tubular spacer 28 has edges 30, 32 at its ends. In initial assembly, these edges 30, 32 butt against the inside faces of the wheels 10, 12.

The assembly 14, 16 also comprises an elongated one piece tie bolt 34 having a bolt head 36 at one end and a threaded portion 38 at its opposite end. Referring to FIG. 5, openings 24, 26 are formed in the wheels 10, 12 at the location of each pedal assembly 14, 16. Wheel 12 includes means providing threads within the opening 26. This can easily be done by the use of a T-nut 40. T-nut 40 comprises an internally threaded tubular portion 42 which projects from a wall 44. Tubular portion 42 fits within the wheel opening 26. Wall 44 bears against the outer surface of wheel 12.

The pedal assembly 14, 16 further comprises an abutment on the outside of the wheel 10. The abutment function could be performed by the portion of the outer surface of the wheel 10 which immediately surrounds the opening 24. However, in preferred form, a washer 46 is provided to serve as the abutment. Washer 46 includes a central opening 48 which is sized to snugly receive the shaft of the bolt 34 (FIG. 4).

Wheel assembly 14, 16 further includes a second tubular sleeve spacer 50. This tubular spacer is preferably constructed from metal. It closely surrounds the shaft of the bolt 34. At a first end 52 it contacts the abutment 46. At the second end 54 it contacts the inside surface of the bolt head 36.

The pedal member 56 of the pedal assembly 14, 16 is preferably a solid block of moldable plastic, or an equivalent material. It includes an elongated center opening 58 in which the tubular sleeve spacer 50 is received.

The unicycle is assembled in the following manner. The two wheels 10, 12, with tires 18 attached, are brought close together. The pedal assemblies are then assembled one at a time. The assembly procedure involves inserting the threaded end portion 38 of the tie bolt 34 first through the tubular sleeve spacer 50. The pedal member 56 is installed onto the spacer 50, either before or after the bolt 34 is inserted through the spacer 50. Then, the threaded end portion 38 of the tie bolt 34 is inserted through the central opening 48 of the abutment 46. Then, the threaded end portion of tie bolt 34 is inserted through the opening 24 in wheel 10. Next, the threaded end portion 38 is inserted through the tubular spacer 28. Lastly, the threaded end portion 38 is threaded into the threaded portion 42 of the T-nut 40. Then, a wrench is used on the bolt head 36, for tightening the bolt 34. The tightening first draws all of the components together, and then puts the tie bolt 34 in tension. Tensioning of the tie bolt 34 puts the tubular spacers 28, 50 in compression. As tightening proceeds, the edges 30, 32 of the tubular spacer 28 dig into the inner surfaces of the wheels 10, 12. The tubular sleeve spacer 50 functions to maintain a constant spacing of the bolt head 36 relative to the abutment 46. The spacing of the two wheels 10, 12 can vary in a limited amount, depending on the amount of penetration of the edges 30, 32 into the inner surfaces of the wheels 10, 12.

The pedal element 56 is of a length shorter than the tubular sleeve spacer 50. Thus, its ends are not contacted by the abutment 46 or the bolt head 36. It is free to float somewhat lengthwise of the tubular spacer 50. The diameter of the opening 58 is larger than the outside diameter of the tubular sleeve spacer 50, so that the wheel element 56 can rotate about the tubular sleeve spacer 50.

Following assembly of the components of the pedal assembly in the manner described, a cap 60 of soft plastic or similar material is snapped onto the bolt head 36, to both provide a soft cover and give the outer end of the pedal assembly a decorative appearance.

Referring to FIG. 4, in use, the weight of the user applied to the pedal member 56 wants to bend the portion of the tie bolt 34 which projects outwardly from the wheel 10. The tight fit of the tie bolt 34 within the wheel opening 24 stiffens the overhanging outboard portion of the tie bolt 34. The tubular spacers 28, 50 further reinforce the tie bolt 34 against bending. Experimentation with the unicycle has demonstrated a further benefit. It appears that the digging in of the spacer edges into the inner surfaces of the wheel 10, 12 provides the function of a lock washer or lock nut. It appears to stress the loading at the threads in such a way that the tie bolt 34 stays screwed to the T-nut 40 during riding of the unicycle.

It may be desirable to construct the unicycle to include some additional tie bolt assemblies extending between the wheels 10, 12. As shown by FIGS. 8 and 9, two additional tie bolt assemblies 62 may be used and they may be spaced apart in the manner illustrated, i.e. diametrically opposite each other and ninety degrees from the pedal assemblies 14, 16. Openings 64, 66 may be provided at the location of each additional tie bolt assembly 62. Opening 64 is sized to snugly receive the shaft of the tie bolt 68. The head 70 of the tie bolt 68 bears against a washer 72 and the washer 72 bears against the wheel 10. The threaded end portion 74 of the tie bolt 68 threads into a T-nut 76. A tubular spacer 78 is located between the wheels 10, 12. When the tie bolt 68 is tightened, it is put into tension and the tubular spacer 78 is put into compression. The edges at the ends of the tubular spacer 78 dig into the inner surfaces of the wheels 10, 12, in the same manner as described before, in connection with tubular spacer 28.

As shown by FIGS. 6, 7 and 9, a plurality of individual tubular spacers 26 may be replaced by a single tubular spacer 80. Tubular spacer 80 is of such a diameter that it can surround all of the tie bolts. It has edges at its ends which dig into the inner surfaces of the wheels 10, 12. A unicycle of this construction can be made with only the use of the two pedal assemblies for connecting the wheels 10, 12 together, or the wheels 10, 12 can be connected together by the pedal assemblies aided by additional tie bolt assemblies.

The wheels 10, 12 can be constructed from any suitable material, including metals and plastics.

Preferably, the wheels 10, 12 are constructed from a wood product sheet material. This term is used to include plywood and the various types of composition boards involving sawdust and/or wood chips or flakes.

The width and diameter of the unicycle may vary. However, it is desired that the pedals be relatively close together and that they be positioned relatively close to the rim of the unicycle, so that they are both relatively close to the floor or ground during the riding of the unicycle. In a typical example, the center-to-center spacing of the pedal supporting tie bolts may be six to nine inches. The wheel diameter may be ten to twelve inches. The unicycle width may be five to seven inches. The tubular spacers 28 used in the preferred embodiment may be about two and one half inches in outside diameter. The pedals may be about three and three fourths inches long, about two and three fourths inches wide, and about one and one-eigth inch thick.

Various other modifications can be made in the construction and design of the unicycle without departing from a use of the present invention. In some unicycles nontubular spacers can be used. When tubular spacers are used the cross sectional shape can vary. Circular tubular pipe is readily available and is relatively inexpensive. However, this step is not critical. The examples which are illustrated and described constitute the best mode of the invention but they are still just examples. The scope of protection is not to be limited by these examples, but only by the claims, interpreted by the use of the doctrine of equivalents.

What is claimed is:

1. A unicycle comprising a pair of axially spaced apart disk wheels and a pair of pedal assemblies spaced apart diametrically which also serve to secure the two wheels together and make the unicycle a unitary structure, each said pedal assembly comprising:
    an elongated one piece tie bolt having a head at one end and a threaded portion at its opposite end,
    a pair of aligned bolt receiving openings in the wheels, with the opening in a first of the wheels being sized to snugly receive a midportion of the tie bolt and with the opening in the second wheel being internally threaded to mate with the threads at the end of the tie bolt,
    abutment means axially outwardly of the first wheel including a bolt receiving opening coaxial with the bolt receiving opening in said wheel, through which the tie bolt extends, said tie bolt being slidable in position relative to the abutment means,
    said bolt head being spaced outwardly from said abutment means,
    a tubular sleeve spacer closely surrounding the tie bolt between the bolt head and the abutment means, said tubular sleeve spacer sleeve extending axially between the bolt head and the abutment means,
    a pedal surrounding said tubular sleeve spacer, said pedal being freely rotatable on said tubular sleeve spacer,
    said disk wheels having rim portions positioned radially outwardly of the tie bolts of the two pedal assemblies,
    said tie bolts for the two pedal assemblies being spaced apart diametrically of the wheels, and
    said unicycle further comprising a tubular spacer member between the wheels, of a diameter slightly larger than the diametrical spacing of the tie bolts, said tubular spacer member closely surrounding both tie bolts and presenting an edge at each of its ends, and
    wherein when the tie bolts are tightened the tie bolts are put into tension, the tubular spacer member is put into compression between the two wheels, and the edges at the ends of the tubular spacer member dig into the wheels, and each tubular sleeve spacer is put into compression between its first wheel and its bolt head, and wherein the compression is of such a magnitude that the two wheels are secured together and the position of each to the other is fixed, by the two pedal assemblies.

2. A unicycle according to claim 1, wherein the wheels are circular disks made from a wood product board.

3. A unicycle according to claim 2, wherein the tubular spacer member is a length of plastic pipe.

4. A unicycle according to claim 1, wherein the tubular spacer member is a length of plastic pipe.

5. A unicycle according to claim 1, wherein the pedal is a one piece block and includes a center passageway sized to receive the tubular sleeve spacer, said pedal also extending between the first wheel and the head of the bolt but being shorter than the tubular sleeve spacer so that it is free to rotate.

6. A unicycle according to claim 1, wherein the abutment means comprises a thin annular washer closely surrounding the bolt, said washer making contact with the first wheel and said tubular sleeve spacer making compressive load transferring contact with said washer.

7. A unicycle according to claim 1, comprising at least one additional tie bolt circumferentially spaced from the pedal assemblies, each said additional tie bolt being positioned to be surrounded by the tubular spacer member, and each said additional tie bolt extending through aligned openings in the wheels and having a head which bears against one of the wheels, a threaded portion at its opposite end, and wherein a nut is carried by the other wheel and to which the threaded end portion of the tie bolt is connected, said additional tie bolt being in tension and putting the said tubular spacer member in compression.

* * * * *